(12) United States Patent
Fontanez (10) Patent No.: US 10,419,283 B1
(45) Date of Patent: Sep. 17, 2019

(54) METHODS, SYSTEMS, AND COMPUTER READABLE MEDIUMS FOR TEMPLATE-BASED PROVISIONING OF DISTRIBUTED COMPUTING SYSTEMS

(71) Applicant: VCE Company, LLC., Richardson, TX (US)

(72) Inventor: Jonathan Fontanez, Raleigh, NC (US)

(73) Assignee: VCE IP Holding Company LLC, Richardson, TX (US)

( * ) Notice: Subject to any disclaimer, the term of this patent is extended or adjusted under 35 U.S.C. 154(b) by 605 days.

(21) Appl. No.: 15/057,451

(22) Filed: Mar. 1, 2016

(51) Int. Cl.
*H04L 12/24* (2006.01)
*H04L 29/08* (2006.01)

(52) U.S. Cl.
CPC .......... *H04L 41/0806* (2013.01); *H04L 41/12* (2013.01); *H04L 67/10* (2013.01); *H04L 67/34* (2013.01)

(58) Field of Classification Search
USPC ........................................ 709/212, 217, 219
See application file for complete search history.

(56) References Cited

U.S. PATENT DOCUMENTS

| | | | |
|---|---|---|---|
| 2007/0192329 A1* | 8/2007 | Croft ..................... | G06F 3/1415 |
| 2012/0147894 A1* | 6/2012 | Mulligan ............ | G06F 9/45533 370/395.53 |
| 2012/0203823 A1* | 8/2012 | Manglik ............... | G06F 9/5072 709/203 |
| 2014/0165060 A1* | 6/2014 | Muller ................. | G06F 9/5022 718/1 |

* cited by examiner

*Primary Examiner* — Chirag R Patel
*Assistant Examiner* — Marshall M McLeod
(74) *Attorney, Agent, or Firm* — Jenkins, Wilson, Taylor & Hunt P.A.

(57) ABSTRACT

Methods, systems, and computer readable mediums for template-based provisioning of distributed computing systems are disclosed. In some examples, a method includes selecting a provisioning template from a number of provisioning templates for provisioning management software on a distributed computing system. The method includes deploying containerized management agents onto the distributed computing system according to the provisioning template, which then causes the distributed computing system to execute the containerized management agents on a software container engine executing on the distributed computing system. The method includes configuring the containerized management agents to report to a master management agent.

14 Claims, 6 Drawing Sheets

METHODS, SYSTEMS, AND COMPUTER READABLE MEDIUMS FOR TEMPLATE-BASED PROVISIONING OF DISTRIBUTED COMPUTING SYSTEMS

TECHNICAL FIELD

This specification relates generally to template-based provisioning of distributed computing systems, for example, by deploying containerized management agents according to a provisioning template.

BACKGROUND

In some conventional cloud computing architectures, distributed computing systems distribute software tasks on virtual machines that run on physical servers. One advantage of using virtual machines is that system administrators can automate the provisioning of those virtual machines in an automated fashion to meet computing demands in a highly elastic fashion. Virtual machines, however, can each run a full copy of an operating system along with various software libraries used in hosting an application, which can lead to memory, bandwidth, and storage being used more than is strictly necessary. Containerization reduces some of the excess use of computing resources by eliminating the hypervisor and its virtual machines. Instead, a software container engine can deploy each application in its own container that runs on a single, shared instance of the operating system. A containerized application can be constructed of only the resources needed to run the application, resulting in more efficient use of the underlying resources.

SUMMARY

This specification describes methods, systems, and computer readable mediums for template-based provisioning of distributed computing systems are disclosed. In some examples, a method includes selecting a provisioning template from a number of provisioning templates for provisioning management software on a distributed computing system. The method includes deploying containerized management agents onto the distributed computing system according to the provisioning template, which then causes the distributed computing system to execute the containerized management agents on a software container engine executing on the distributed computing system. The method includes configuring the containerized management agents to report to a master management agent.

DETAILED DESCRIPTION

A distributed computing system can be managed by software. The management software can be configured to determine what devices are attached to the distributed computing system. The devices can be any appropriate type of managed resource and/or device, for example, physical devices, other software, or "views" of the device, which can be considered virtualized. A device can also be a combination of other devices. The management software can be configure to manage these devices and any other appropriate managed resource.

The management software can use template-based provisioning to abstract the representation of managed resources, for example, by virtualizing those resources (e.g., splitting a resource to make it appear as if more than one resource is available) and allowing a system administrator to build a management platform that can be surfaced in various layers of software (e.g., change the way that the distributed computing system appears to virtualization software).

Using template-based containerized management agents allows a system administrator to rapidly provision and expose a distributed computing system as multiple systems and to expose the distributed computing system to various types of users. Moreover, using template-based containerized management agents allows the management software to easily scale to large numbers of systems, handle rollback provisioning, auto-scale to new products, and allows provisioning to be management through a mobile device, for example, a tablet computer.

Figure 1:
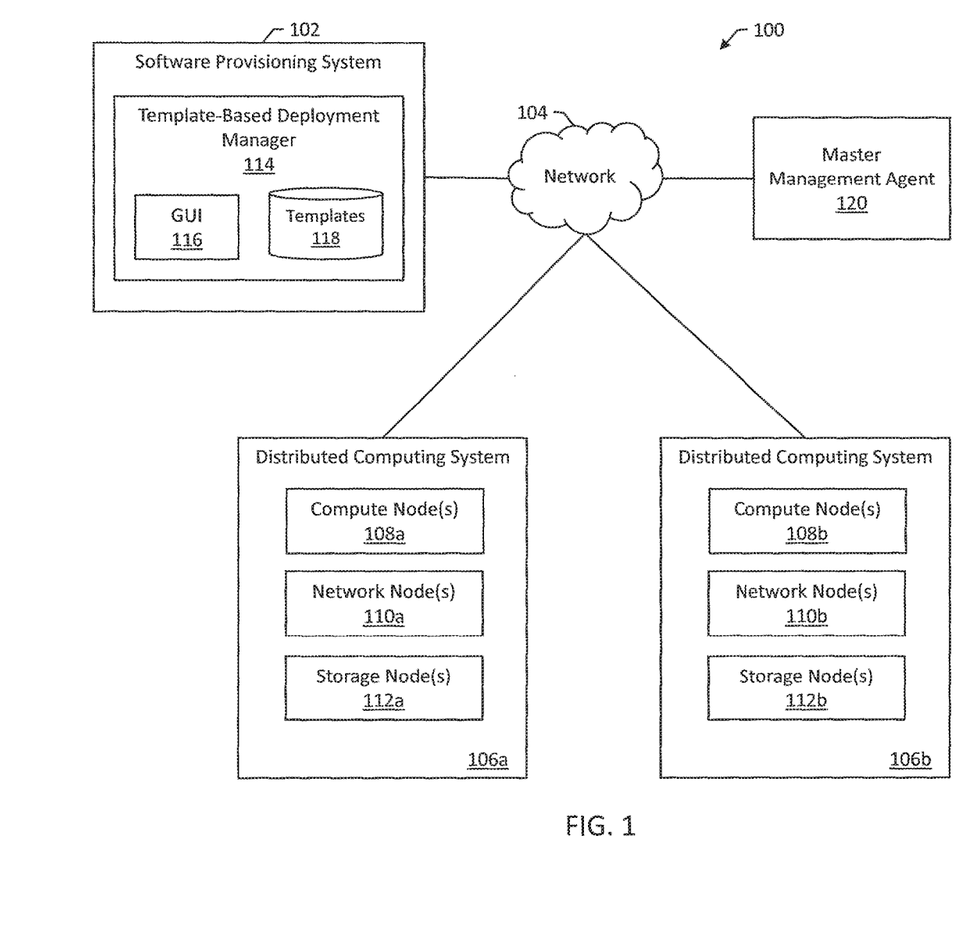
FIG. 1 is a block diagram of an example system for template-based provisioning of distributed computing systems.

FIG. 1 is a block diagram of an example system 100 for template-based provisioning of distributed computing systems. The system 100 includes a software provisioning system 102 that communicates over a data communications network 104 with a number of distributed computing systems 106a-b. As used herein, a distributed computing system may include any computing system that comprises a plurality of managed resources and/or devices. In some examples, a distributed computing system may include one or more data center facilities, each of which includes one or more resources and/or devices. Alternatively, a distributed computing system may include one or more converged infrastructure (CI) systems, such as, for example, a Vblock® System, a VxBlock™ System, a VxRack™ System, and a VxRail™ System from VCE Company, LLC. A CI system can comprise multiple devices and/or resources (e.g., components, physical resources and/or virtual resources) in a preconfigured or prepackaged computing platform, where some resources are developed and/or manufactured by multiple entities. For example, an exemplary CI system can comprise data storage devices, servers, networking equipment, system management software such as VCE Vision™ from VCE Company, LLC, and software for managing physical resources and/or virtualized resources (e.g., virtual servers).

Each of the distributed computing systems 106a-b includes a number of computers configured, by virtue of appropriate programming, to execute software by distributing software tasks across the computers. As used herein, the term "computer" may comprise and/or be embodied as a processor, a compute component, a blade server, and the like. As illustrated, the distributed computing systems 106a-b include one or more compute nodes 108a-b, one or more network nodes 110a-b, and one or more storage nodes 112a-b. In some examples, each of the distributed computing systems 106a-b is an integrated system of both hardware and software. For example, each of the distributed computing systems 106a-b can include a rack of hardware and software configured specifically to execute on that rack of hardware, e.g.; by virtue of knowledge of the specific hardware in the rack and data interconnections between the hardware.

The software provisioning system 102 includes one or more processors (e.g., one or more computers) configured, by virtue of appropriate programming, to provision management software on the distributed computing systems 106*a-b*. The software provisioning system 102 can be, e.g., a personal computer or a tablet computer or a mobile device. The software provisioning system 102 typically includes one or more processors, memory, a display device, and a user input device.

A template-based deployment manager 114 is implemented on the software provisioning system 102. The template-based deployment manager 114 is configured, by virtue of appropriate programming, to deploy containerized management agents onto one or more of the distributed computing systems 106*a-b* according to a provisioning template selected from a repository of provisioning templates 118. In response, the distributed computing systems 106*a-b* execute the containerized management agents on a software container engine. Software container engines are described further below with reference to FIG. 2.

Each provisioning template specifies an abstract representation of managed resources of a distributed computing system. For example, a provisioning template can be structured as a metadata file with attributes and values that specify managed resources and actions for managing those resources. The template-based deployment manager 114 can read the provisioning template at run time and execute a deployment in according with the provisioning template. The provisioning templates can be generated by a system administrator, and the provisioning templates can be configured for specific distributed computing systems by virtue of having knowledge of the specific hardware and software in the distributed computing systems.

For example, deploying the containerized management agents onto a distributed computing system can include virtualizing a managed resource. Virtualizing a managed resource can include splitting the managed resource so that one or more of the containerized management agents present the managed resource as a number of virtual resources. For another example, consider a situation where a distributed computing system will host a multitenant application. The provisioning template can specify that the single distributed computing system is configured as separate entities, one for each tenant, each of which is exposed to higher-level virtual machine software layers.

In some examples, the template-based deployment manager 114 is a thin client that can be installed on various platforms, e.g., on a management platform of a distributed computing system, run from a disk (e.g., a universal serial bus flash drive), or run on a laptop external to the distributed computing system. If the template-based deployment manager 114 is installed, it can provide, e.g., a dynamic host configuration protocol (DHCP) server to pixie boot stateless installations of the management software.

When a new distributed computing system is brought online, the new distributed computing system can run through automatic provisioning or manual provisioning by a system administrator. Automatic provisioning can be accomplished by causing the new distributed computing system to point to the template-based deployment manager 114 as a DHCP server or any appropriate type of server, and then the deployment of the management software can be carried out without system administrator intervention based on the identification of the new distributed computing system. If a template is located for the system type, or set as a default by the system administrator, then it can be automatically loaded. In the case of manual provisioning, as long as there is network access to the new distributed computing system, a system administrator can configure a new template and provision the new system using the template-based deployment manager 114.

The template-based deployment manager 114 can include a graphical user interface 116 through which a system administrator can select a provisioning template and other parameters related to a deployment. The graphical user interface 116 can be implemented using any appropriate technology, e.g., as a series of web pages for display in a web browser.

The template-based deployment manager 114 configures the containerized management agents to report to a master management agent 120. The master management agent 120 can be implemented on one or more of the distributed computing systems 106*a-b*, the software provisioning system 102, or any other appropriate computer system. By configuring the containerized management agents to report to the master management agent 120, the master management agent 120 can cause the containerized management agents to act as a number of linked nodes in a single system.

In some examples, deploying the containerized management agents onto a distributed computing system according to the provisioning template includes persisting the provisioning template on the distributed computing system by storing in the provisioning template on local storage of the distributed computing system. In some examples, deploying the containerized management agents includes storing the provisioning template on local storage associated with the master management agent 120 and pushing the provisioning template from the master management agent 120 to the distributed computing system in response to restarting the distributed computing system. In that case, the configuration of a distributed computing system can be replicated across a number of different distributed computing systems that are operatively connected, e.g., by placing two or more systems in a standby mode to look like the current deployment target. This allows multiple distributed computing systems to appear to certain software layers as the same hardware, thus enabling seamless failover and auto-management of workload migration.

In some cases, the template-based deployment manager 114 later updates the containerized management agents. For example, the template-based deployment manager 114 can download, after deploying the containerized management agents, a new containerized management agent to support a new managed resource. In response, the distributed computing system executes the new containerized management agent alongside the containerized management agents on the software container engine executing on the distributed computing system.

Figure 2:
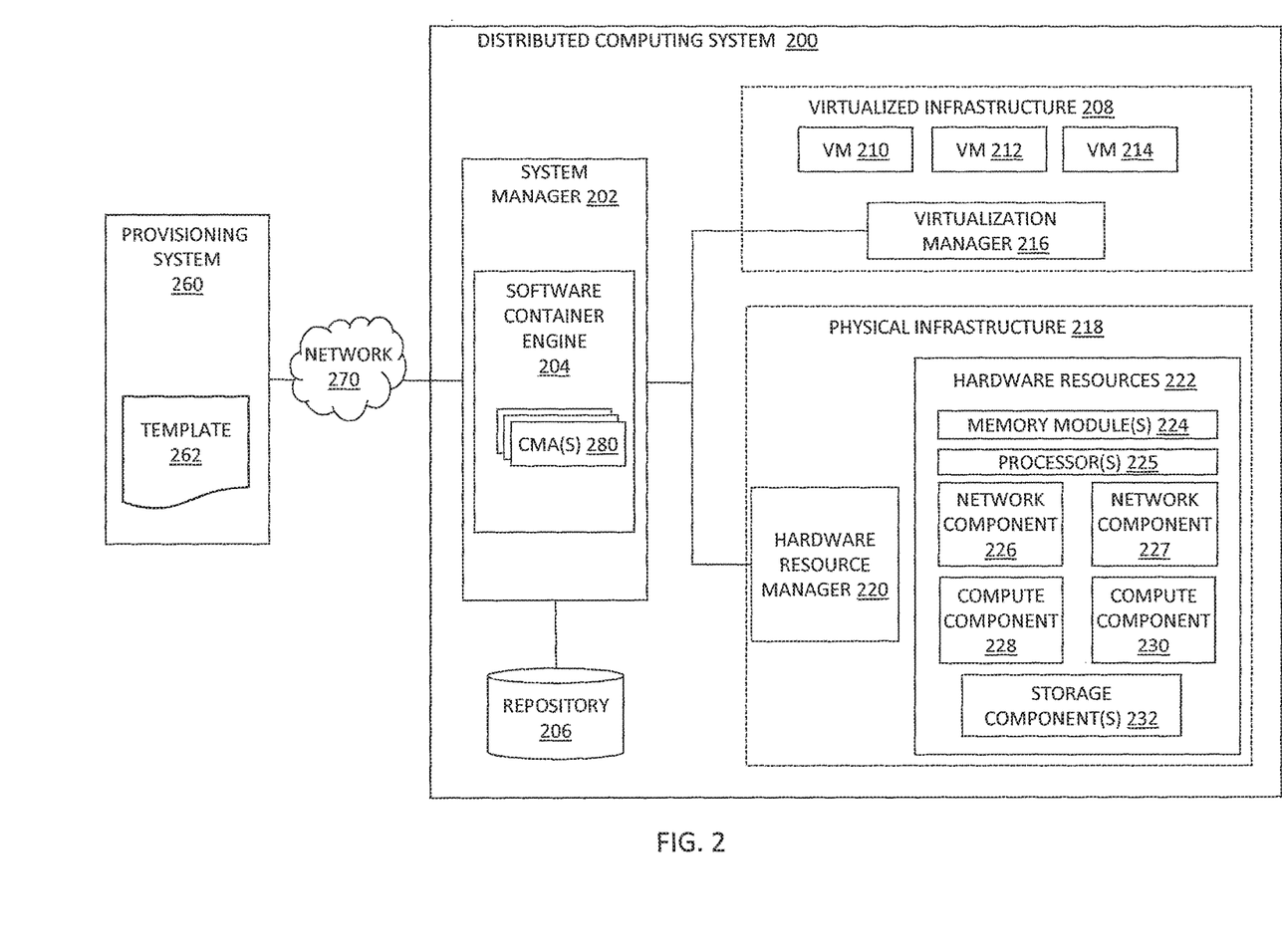
FIG. 2 is a block diagram of an example distributed computing system configured to be provisioned with containerized management agents by a template-based provisioning system.

FIG. 2 is a block diagram of an example distributed computing system 200 configured to be provisioned with containerized management agents by a template-based provisioning system 260. In some examples, the distributed computing system 200 is configured to provide data management functionality, cloud service functionality, and/or other functionality.

For example, the provisioning system 260 of the distributed computing system 200 can be an entity (e.g., software executing on a processor or a web-based interface) for allowing a user (e.g., a human operator or an automated system) to interact with the distributed computing system 200. The provisioning system 260 can communicate with the distributed computing system 200, e.g., using a data communications network 270.

The distributed computing system 200 includes a system manager 202, a repository 206, a virtualized infrastructure 208, and a physical infrastructure 218. The system manager 202 can be configured to manage performance, resource utilization levels, and other aspects associated with virtualized infrastructure 208 and/or physical infrastructure 218. In some examples, the system manager 202 includes or provides a graphical user interface (GUI), a command-line interface (CLI), an application programming interface (API), and/or or other communications interface. For example, the system manager 202 can provide a web-based GUI usable for managing the virtualized infrastructure 208 and/or the physical infrastructure 218.

The system manager 202 can include a software container engine 204 for executing containerized software agents. The software container engine 204 can be any appropriate entity (e.g., hardware, firmware, and/or software executing on a processor) for hosting containerized software agents. For example, the software container engine 204 can be configured to support multiple containerized software agents that share the same operating system kernel, so that the containerized software agents can execute nearly immediately and make efficient use of memory. The software container engine 204 can isolate containerized software agents from one another and the underlying infrastructure, which can add a layer of protection for the system manager 202.

Software images for the containerized software agents can be constructed from layered filesystems so they can share common files, making disk usage and image downloads use fewer computing resources, A containerized software agent typically includes an application and all of its dependencies and runs as an isolated process in userspace on a host operating system. A containerized software agent need not be tied to any specific infrastructure.

The provisioning system 260 deploys containerized management agents 280 onto the distributed computing system 200 according to a provisioning template 262. In response, the distributed computing system 200 executes the containerized management agents 280 on the software container engine 204. The containerized management agents 280 perform various functions of the system manager 202. Since the containerized management agents 280 execute on the software container engine 204, the containerized management agents use fewer computing resources than management software that runs on virtual machines, and the containerized management agents 280 can be replaced or added to more easily and quickly when compared to management software that runs on virtual machines.

In some examples, the provisioning system 260 can persist the provisioning template on the distributed computing system 200 by storing the provisioning template on local storage of the distributed computing system 200. For example, the provisioning template 262 can be stored in repository 206. Repository 206 can include any data storage unit (e.g., a database or a plurality of databases) that can be configured to store event history information, e.g., event. The repository 206 can be implemented using one or more computing platforms, devices, or systems.

The virtualized infrastructure 208 can include a virtualization environment configured to simulate components of a computing device, such as a processor, system memory, and a storage device, for executing one or more virtual machines (VMs) (e.g., VM 210, VM 212, and VM 214). Each of the virtual machines can be configured to perform various functions and/or services, such as web server functions or cloud application services, and can interact with various nodes, components, and/or users.

In some examples, the virtualization manager 216 is configured to allow logical entities to be created, deleted, or modified using an API and/or a GUI. The virtualization manager 216 can be any suitable entity (e.g., software executing in a virtual machine) for managing aspects associated with the virtualized infrastructure 208. In some examples, the virtualization manager 216 is configured to be managed by one or more of the containerized management agents 280.

The physical infrastructure 218 can include physical or hardware resources 222, such as memory module(s) 224, processor(s) 225, compute components 228 and 230, network components 226 and 227, and storage component(s) 232. The hardware resources 222 can be configured for use by one or more virtual entities. In some examples, the network components 226-227 (e.g., network switches or storage area network (SAN) switches) can be configured to enable communication between the components in the distributed computing system 200.

The hardware resource manager 220 can be any suitable entity (e.g., software executing in a virtual machine) for managing aspects associated with the physical infrastructure 218. In some examples, the hardware resource manager 220 can be configured to provision hardware resources 222 via one or more communications interfaces. For example, the hardware resource manager 220 can provision the hardware resources 222 for implementing one or more virtual entities in the virtualized infrastructure 208. In some examples, the hardware resource manager 220 is a management component or entity, such as a unified infrastructure manager (UIM) or a unified computing system (UCS) director entity, which is configured to provision the physical hardware of the distributed computing system 200, e.g., as directed by one or more of the containerized management agents 280.

The processor(s) 225 can include, e.g., a microprocessor, a central processing unit (CPU), or any other like hardware based processing unit. In some examples, some aspects of the disclosed subject matter can be stored in the memory module(s) 224, which can include random access memory (RAM), read only memory (ROM), optical read/write memory, cache memory, magnetic read/write memory, flash memory, or any other non-transitory computer readable medium. In some examples, the processor(s) 225 and memory module(s) 224 can be used to execute, implement, and/or manage the operation of some aspects of the disclosed subject matter.

In some examples, each of storage components 232-234 includes a storage medium or storage unit that is configured to store information accessible by the processor(s) 225 via a system bus. In some examples, the repository 206 or portions thereof can utilize the storage component(s) 232 and/or the memory module(s) 224. For example, the repository 206 may be implemented using the storage component(s) 232. In some examples, the repository 206 and/or the storage components 232 can include or utilize one or more storage area networks.

FIGS. 3A-D depict views of an example graphical user interface for template-based provisioning of distributed computing systems with management software. The graphical user interface can be implemented, for example, as a series of web pages for display on a web browser, e.g., on the software provisioning system 102 of FIG. 1. The graphical user interface can include more or fewer views that those depicted in FIGS. 3A-D, which are described for purposes of illustration.

Figure 3A:
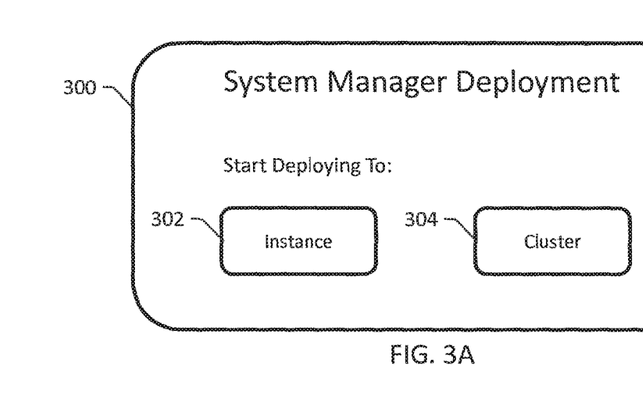
FIGS. 3A-D depict views of an example graphical user interface for template-based provisioning of distributed computing systems.

FIG. 3A shows a first view 300 of the graphical user interface for starting deployment of management software onto one or more distributed computing systems. The first view 300 presents a system administrator with two buttons 302 and 304 to start a deployment for either a single instance of the management software or a deployment to a cluster of distributed computing systems.

Figure 3B:
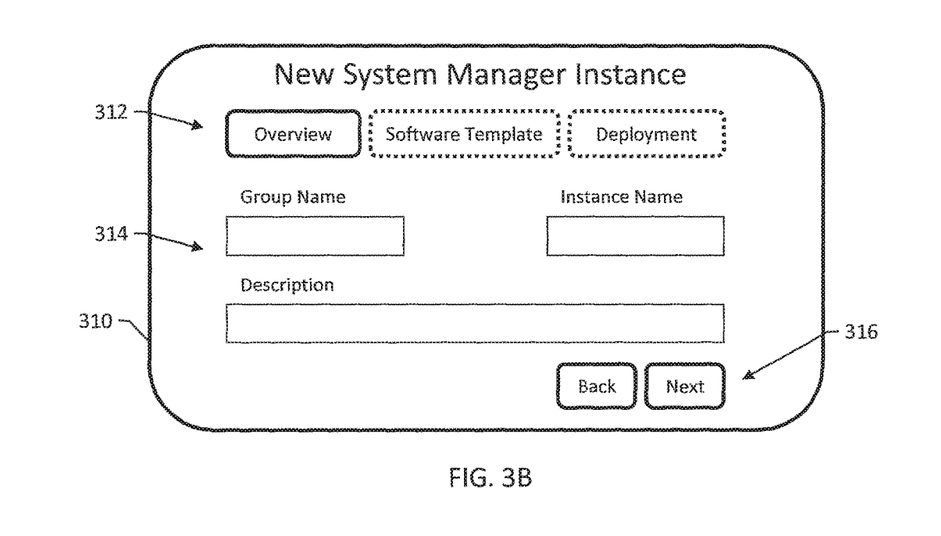

FIG. 3B shows a second view 310 of the graphical user interface that can be displayed, e.g., after the system administrator selects the instance button displayed in the first view 300 to start a deployment to a single instance. The second view 310 includes a row of tabs 312 for entering various preferences and information for the deployment. As depicted in FIG. 3B, the second view 310 has an "overview" tab selected. The system administrator can enter overview information for the deployment into a number of text boxes 314, e.g., text boxes for a group name, an instance name, and a description. The second view 310 also includes back and next buttons 316 for advancing or going backwards between the views of the graphical user interface.

Figure 3C:
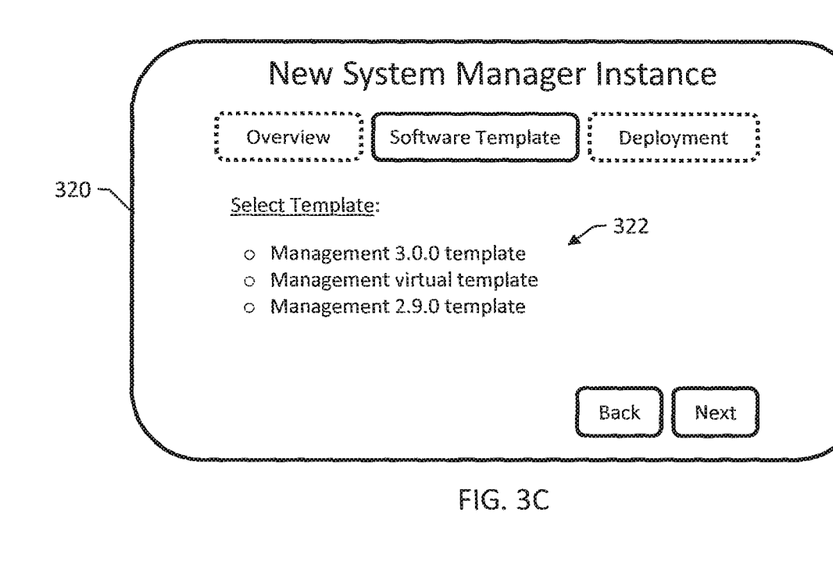

FIG. 3C shows a third view 320 of the graphical user interface for entering information specifying a software template. As depicted in FIG. 3C, the third view 320 has a "software template" tab selected. The third view 320 presents a list of available templates 322, specified by names of the templates, and a number of radio buttons for selecting one of the available templates to use as a provisioning template. The third view 320 can display, for example, the names of the templates available in the template repository 118 of FIG. 1.

Figure 3D:
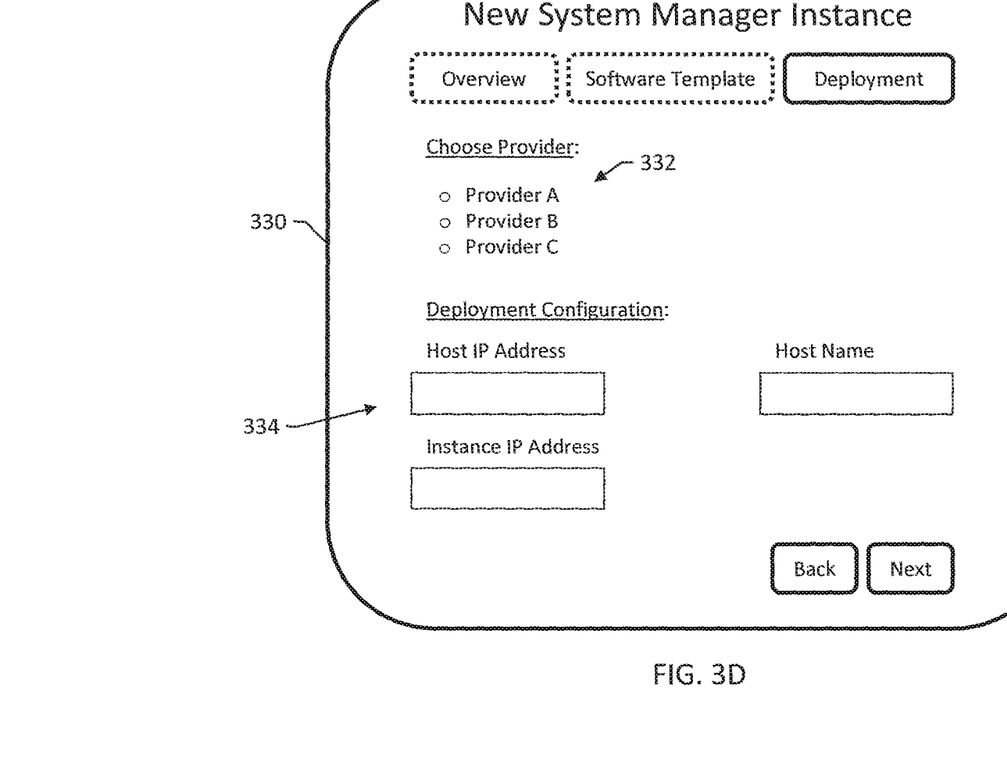

FIG. 3D shows a fourth view 330 of the graphical user interface for selecting further options relating to the deployment. As depicted in FIG. 3D, the fourth view 330 has a "deployment" tab selected. The fourth view 330 presents a list of available providers 332, e.g., providers of software to which the management software will expose managed resources of a the distributed computing system. The system administrator can enter deployment information for the deployment into a number of text boxes 334, e.g., text boxes for a host Internet protocol (IP) address, an instance IP address, and a host name.

Figure 4:
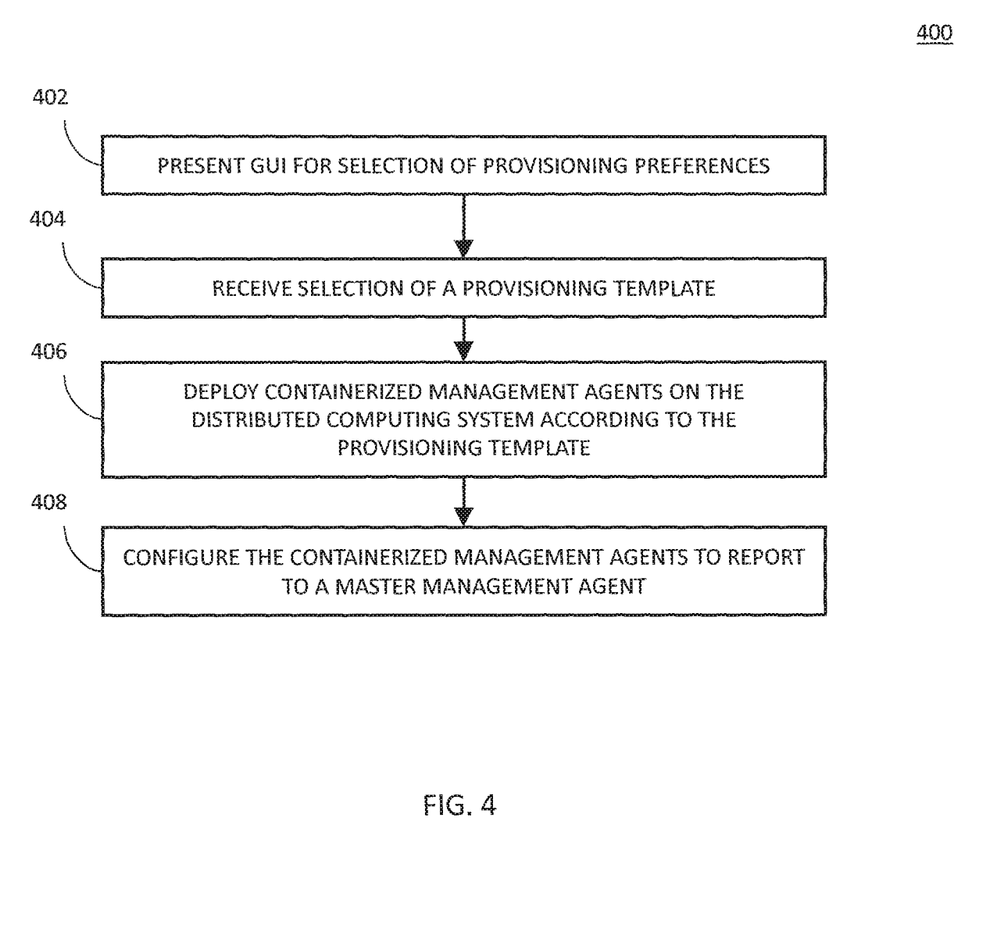
FIG. 4 is a flow diagram of an example method for template-based provisioning of distributed computing systems.

FIG. 4 is a flow diagram of an example method 400 for template-based provisioning of distributed computing systems. The method 400 will be described with respect to a system of one or more processors (e.g., one or more computers) that performs the method 400, e.g., the provisioning system 260 of FIG. 2. The system is configured to perform the method by virtue of appropriate programming.

The system presents a graphical user interface for selection of provisioning preferences (block 402). For example, the system can present one or more of the screens of the example graphical user interface depicted in FIGS. 3A-D and possibly other screens as appropriate. The system can present the graphical user interface on a display device, e.g., using a web browser.

The system receives selection of a provisioning template and, in some cases, other selections related to provisioning (block 404). For example, a system administrator can interact with the graphic user interface to supply the selection of the provisioning template. The provisioning template specifies an abstract representation of managed resources of the distributed computing system.

The system deploys containerized management agents on the distributed computing system according to the provisioning template (block 406). In response, the distributed computing system executes the containerized management agents on a software container executing on the distributed computing system. In some examples, deploying the containerized management agents onto the distributed computing system according to the provisioning template includes persisting the provisioning template on the distributed computing system by storing in the provisioning template on local storage of the distributed computing system.

For example, deploying the containerized management agents onto the distributed computing system according to the provisioning template can include virtualizing a managed resource. Virtualizing the managed resource can include splitting the managed resource so that one or more of the containerized management agents present the managed resource as a number of virtual resources. The provisioning template can specify an identifier of the managed resource and the number of virtual resources to present for the managed resource.

The system configures the containerized management agents to report to a master management agent (block 408). In some examples, deploying the containerized management agents includes storing the provisioning template on local storage associated with the master management agent and pushing the provisioning template from the master management agent to the distributed computing system in response to restarting the distributed computing system.

In some cases, the system later updates the containerized management agents. For example, the system can download, after deploying the containerized management agents, a new containerized management agent to support a new managed resource. In response, the distributed computing system executes the new containerized management agent alongside the containerized management agents on the software container engine executing on the distributed computing system.

Various combinations and sub-combinations of the structures and features described herein are contemplated and will be apparent to a skilled person having knowledge of this disclosure. Any of the various features and elements as disclosed herein may be combined with one or more other disclosed features and elements unless indicated to the contrary herein. Correspondingly, the subject matter as hereinafter claimed is intended to be broadly construed and interpreted, as including all such variations, modifications and alternative embodiments, within its scope and including equivalents of the claims. It is understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method comprising:

selecting, by a system of one or more processors, a provisioning template from a plurality of provisioning templates for provisioning management software on a distributed computing system;

deploying, by the system of one or more processors, a plurality of containerized management agents onto the distributed computing system according to the provisioning template, thereby causing the distributed computing system to execute the containerized management agents on a software container engine executing on the distributed computing system, wherein deploying the containerized management agents onto the distributed computing system according to the provisioning template comprises virtualizing a managed resource, and wherein virtualizing the managed resource comprises splitting the managed resource so that one or more of the containerized management agents present the managed resource as a plurality of virtual resources; and configuring, by the system of one or more processors, the containerized management agents to report to a master management agent.

2. The method of claim 1, wherein the provisioning template specifies an abstract representation of a plurality of managed resources of the distributed computing system.

3. A method comprising:

selecting, by a system of one or more processors, a provisioning template from a plurality of provisioning templates for provisioning management software on a distributed computing system;

deploying, by the system of one or more processors, a plurality of containerized management agents onto the distributed computing system according to the provisioning template, thereby causing the distributed computing system to execute the containerized management agents on a software container engine executing on the distributed computing system;

configuring, by the system of one or more processors, the containerized management agents to report to a master management agent; and updating the containerized management agents by downloading, after deploying the containerized management agents, a new containerized management agent to support a new managed resource and causing the distributed computing system to execute the new containerized management agent alongside the containerized management agents on the software container engine executing on the distributed computing system.

4. The method of claim 1, wherein deploying the containerized management agents onto the distributed computing system according to the provisioning template comprises persisting the provisioning template on the distributed computing system by storing the provisioning template on local storage of the distributed computing system.

5. A method comprising:

selecting, by a system of one or more processors, a provisioning template from a plurality of provisioning templates for provisioning management software on a distributed computing system;

deploying, by the system of one or more processors, a plurality of containerized management agents onto the distributed computing system according to the provisioning template, thereby causing the distributed computing system to execute the containerized management agents on a software container engine executing on the distributed computing system, wherein deploying the containerized management agents onto the distributed computing system according to the provisioning template comprises storing the provisioning template on local storage associated with the master management agent and pushing the provisioning template in response to restarting the distributed computing system; and configuring, by the system of one or more processors, the containerized management agents to report to a master management agent.

6. A system comprising:

a distributed computing system comprising a plurality of computers configured to execute software by distributing a plurality of software tasks across the plurality of computers;

a software provisioning system comprising one or more processors configured to provision management software on the distributed computing system; and a template-based deployment manager, implemented on the software provisioning system, configured for deploying a plurality of containerized management agents onto the distributed computing system according to a provisioning template, thereby causing the distributed computing system to execute the containerized management agents on a software container engine executing on the distributed computing system, and for configuring the containerized management agents to report to a master management agent;

wherein deploying the containerized management agents onto the distributed computing system according to the provisioning template comprises virtualizing a managed resource, and wherein virtualizing the managed resource comprises splitting the managed resource so that one or more of the containerized management agents present the managed resource as a plurality of virtual resources.

7. The system of claim 6, wherein the provisioning template specifies an abstract representation of a plurality of managed resources of the distributed computing system.

8. A system comprising:

a distributed computing system comprising a plurality of computers configured to execute software by distributing a plurality of software tasks across the plurality of computers;

a software provisioning system comprising one or more processors configured to provision management software on the distributed computing system; and a template-based deployment manager, implemented on the software Provisioning system, configured for deploying a plurality of containerized management agents onto the distributed computing system according to a provisioning template, thereby causing the distributed computing system to execute the containerized management agents on a software container engine executing on the distributed computing system, and for configuring the containerized management agents to report to a master management agent;

wherein the template-based deployment manager is configured for updating the containerized management agents by downloading, after deploying the containerized management agents, a new containerized management agent to support a new managed resource and causing the distributed computing system to execute the new containerized management agent alongside the containerized management agents on the software container engine executing on the distributed computing system.

9. The system of claim 6, wherein deploying the containerized management agents onto the distributed computing system according to the provisioning template comprises persisting the provisioning template on the distributed computing system by storing the provisioning template on local storage of the distributed computing system.

10. A system comprising:

a distributed computing system comprising a plurality of computers configured to execute software by distributing a plurality of software tasks across the plurality of computers;

a software provisioning system comprising one or more processors configured to provision management software on the distributed computing system; and a template-based deployment manager, implemented on the software provisioning system, configured for deploying a plurality of containerized management agents onto the distributed computing system according to a provisioning template, thereby causing the distributed computing system to execute the containerized management agents on a software container engine executing on the distributed computing system, and for configuring the containerized management agents to report to a master management agent;

wherein deploying the containerized management agents onto the distributed computing system according to the provisioning template comprises storing the provisioning template on local storage associated with the master management agent and pushing the provisioning template in response to restarting the distributed computing system.

11. A non-transitory computer readable medium having stored thereon executable instructions which, when executed by a software provisioning system comprising one or more processors, cause the software provisioning system to perform operations comprising:

selecting a provisioning template from a plurality of provisioning templates for provisioning management software on a distributed computing system;

deploying a plurality of containerized management agents onto the distributed computing system according to the provisioning template, thereby causing the distributed computing system to execute the containerized management agents on a software container engine executing on the distributed computing system, wherein deploying the containerized management agents onto the distributed computing system according to the provisioning template comprises virtualizing a managed resource, and wherein virtualizing the managed resource comprises splitting the managed resource so that one or more of the containerized management agents present the managed resource as a plurality of virtual resources; and configuring the containerized management agents to report to a master management agent.

12. The computer readable medium of claim 11, wherein the provisioning template specifies an abstract representation of a plurality of managed resources of the distributed computing system.

13. A non-transitory computer readable medium having stored thereon executable instructions which, when executed by a software provisioning system comprising one or more processors, cause the software provisioning system to perform operations comprising:

selecting a provisioning template from a plurality of provisioning templates for provisioning management software on a distributed computing system;

deploying a plurality of containerized management agents onto the distributed computing system according to the provisioning template, thereby causing the distributed computing system to execute the containerized management agents on a software container engine executing on the distributed computing system; and configuring the containerized management agents to report to a master management agent;

the operations comprising updating the containerized management agents by downloading, after deploying the containerized management agents, a new containerized management agent to support a new managed resource and causing the distributed computing system to execute the new containerized management agent alongside the containerized management agents on the software container engine executing on the distributed computing system.

14. A non-transitory computer readable medium having stored thereon executable instructions which, when executed by a software provisioning system comprising one or more processors, cause the software provisioning system to perform operations comprising:

selecting a provisioning template from a plurality of provisioning templates for provisioning management software on a distributed computing system;

deploying a plurality of containerized management agents onto the distributed computing system according to the provisioning template, thereby causing the distributed computing system to execute the containerized management agents on a software container engine executing on the distributed computing system; and configuring the containerized management agents to report to a master management agent;

wherein deploying the containerized management agents onto the distributed computing system according to the provisioning template comprises storing the provisioning template on local storage associated with the master management agent and pushing the provisioning template in response to restarting the distributed computing system.

* * * * *